United States Patent
Adams

(10) Patent No.: US 8,120,703 B2
(45) Date of Patent: Feb. 21, 2012

(54) SOURCE-ADAPTIVE VIDEO DEINTERLACER

(75) Inventor: Dale Richard Adams, Gualala, CA (US)

(73) Assignee: Silicon Image/BSTZ, Sunnyvale, CA (US)

( * ) Notice: Subject to any disclaimer, the term of this patent is extended or adjusted under 35 U.S.C. 154(b) by 1090 days.

(21) Appl. No.: 11/512,754

(22) Filed: Aug. 29, 2006

(65) Prior Publication Data

US 2007/0052846 A1    Mar. 8, 2007

Related U.S. Application Data

(60) Provisional application No. 60/715,711, filed on Sep. 8, 2005.

(51) Int. Cl.
*H04N 7/01* (2006.01)

(52) U.S. Cl. ...................................................... 348/448

(58) Field of Classification Search .................. 348/448, 348/441, 447, 451, 452, 459, 458, 700
See application file for complete search history.

(56) References Cited

U.S. PATENT DOCUMENTS

| | | | |
|---|---|---|---|
| 4,997,321 A | 3/1991 | Adams | |
| 5,357,606 A | 10/1994 | Adams | |
| 5,532,751 A | 7/1996 | Lui | |
| 5,550,592 A * | 8/1996 | Markandey et al. | 348/448 |
| 5,689,301 A * | 11/1997 | Christopher et al. | 348/97 |
| 5,790,269 A | 8/1998 | Masaki et al. | |
| 5,796,875 A | 8/1998 | Read | |
| 5,852,475 A | 12/1998 | Gupta et al. | |
| 5,857,118 A | 1/1999 | Adams et al. | |
| 5,920,356 A | 7/1999 | Gupta et al. | |
| 6,055,018 A | 4/2000 | Swan | |
| 6,064,776 A | 5/2000 | Kikuchi et al. | |
| 6,069,664 A | 5/2000 | Zhu et al. | |
| 6,167,164 A | 12/2000 | Lee et al. | |
| 6,219,747 B1 | 4/2001 | Banks et al. | |
| 6,285,801 B1 | 9/2001 | Mancuso et al. | |
| 6,380,978 B1 | 4/2002 | Adams et al. | |
| 6,385,692 B2 | 5/2002 | Banks et al. | |
| 6,393,505 B1 | 5/2002 | Scalise et al. | |
| 6,421,090 B1 | 7/2002 | Jiang et al. | |
| 6,459,455 B1 | 10/2002 | Jiang et al. | |
| 6,473,476 B1 | 10/2002 | Banks | |
| 6,489,998 B1 | 12/2002 | Thompson et al. | |
| 6,515,706 B1 | 2/2003 | Thompson et al. | |
| 6,587,158 B1 | 7/2003 | Adams et al. | |
| 6,621,937 B1 | 9/2003 | Adams et al. | |

(Continued)

FOREIGN PATENT DOCUMENTS

EP    0881837    12/1998

(Continued)

OTHER PUBLICATIONS

"Analog Devices CMOS 180 MHz DDS/DAC Synthesizer", AD9851, Rev. C, Analog Devices, Inc., www.analog.com.pp. 1-23 (1999).

(Continued)

*Primary Examiner* — Paulos M Natnael
(74) *Attorney, Agent, or Firm* — Blakely, Sokoloff, Taylor & Zafman LLP

(57) ABSTRACT

A method is described for deinterlacing an interlaced video stream. The method includes detecting an occurrence of groups of adjacent fields that are derived from a common original image frame source, and merging field pairs of the interlaced video stream to create a non-interlaced video stream output.

20 Claims, 11 Drawing Sheets

U.S. PATENT DOCUMENTS

| | | | |
|---|---|---|---|
| 6,681,059 B1 | 1/2004 | Thompson | |
| 6,700,622 B2 | 3/2004 | Adams et al. | |
| 6,757,022 B2 | 6/2004 | Wredenhagen et al. | |
| 6,757,442 B1 | 6/2004 | Avinash | |
| 6,859,237 B2 * | 2/2005 | Swartz | 348/700 |
| 6,867,814 B2 | 3/2005 | Adams et al. | |
| 6,975,776 B2 | 12/2005 | Ferguson | |
| 6,999,047 B1 | 2/2006 | Holtslag | |
| 7,023,487 B1 | 4/2006 | Adams | |
| 7,027,099 B2 | 4/2006 | Thompson et al. | |
| 7,089,577 B1 | 8/2006 | Rakib et al. | |
| 7,126,643 B2 | 10/2006 | Song et al. | |
| 7,136,541 B2 | 11/2006 | Zhang et al. | |
| 7,154,556 B1 | 12/2006 | Wang et al. | |
| 7,206,025 B2 | 4/2007 | Choi et al. | |
| 7,236,209 B2 | 6/2007 | Martin | |
| 7,257,272 B2 | 8/2007 | Blake et al. | |
| 7,345,708 B2 | 3/2008 | Winger et al. | |
| 7,349,028 B2 | 3/2008 | Neuman et al. | |
| 7,362,376 B2 | 4/2008 | Winger et al. | |
| 7,391,468 B2 * | 6/2008 | Shah | 348/441 |
| 7,400,359 B1 | 7/2008 | Adams | |
| 7,412,096 B2 | 8/2008 | Neuman et al. | |
| 7,414,671 B1 | 8/2008 | Gallagher et al. | |
| 7,417,686 B2 | 8/2008 | Zhu | |
| 7,474,354 B2 | 1/2009 | Kawamura et al. | |
| 7,515,205 B1 | 4/2009 | Wang et al. | |
| 7,519,332 B1 | 4/2009 | Suematsu | |
| 7,529,426 B2 * | 5/2009 | Neuman | 382/278 |
| 7,551,800 B2 | 6/2009 | Corcoran et al. | |
| 7,557,861 B2 * | 7/2009 | Wyman | 348/441 |
| 7,605,866 B2 | 10/2009 | Conklin | |
| 7,657,098 B2 | 2/2010 | Lin et al. | |
| 7,659,939 B2 | 2/2010 | Winger et al. | |
| 7,667,773 B2 | 2/2010 | Han | |
| 7,710,501 B1 | 5/2010 | Adams et al. | |
| 7,865,035 B2 | 1/2011 | Lin et al. | |
| 7,940,992 B2 | 5/2011 | Johnson et al. | |
| 7,969,511 B2 | 6/2011 | Kim | |
| 7,986,854 B2 | 7/2011 | Kim et al. | |
| 2002/0149685 A1 | 10/2002 | Kobayashi et al. | |
| 2002/0149703 A1 * | 10/2002 | Adams et al. | 348/700 |
| 2004/0042673 A1 | 3/2004 | Boon | |
| 2004/0189877 A1 * | 9/2004 | Choi et al. | 348/700 |
| 2005/0122433 A1 | 6/2005 | Satou et al. | |
| 2005/0128360 A1 | 6/2005 | Lu | |
| 2006/0072037 A1 | 4/2006 | Wyman | |
| 2007/0052845 A1 | 3/2007 | Adams | |
| 2007/0103588 A1 * | 5/2007 | MacInnis et al. | 348/448 |
| 2007/0223835 A1 | 9/2007 | Yamada et al. | |
| 2008/0123998 A1 | 5/2008 | Gomi et al. | |
| 2008/0143873 A1 | 6/2008 | Neuman | |
| 2008/0151103 A1 * | 6/2008 | Asamura et al. | 348/448 |

FOREIGN PATENT DOCUMENTS

| | | |
|---|---|---|
| EP | 1039760 | 9/2000 |
| EP | 1434438 A2 | 6/2004 |
| EP | 1492344 A1 | 12/2004 |
| JP | 2001245155 | 9/2001 |
| JP | 2005122361 A | 5/2005 |
| JP | 2007213125 A | 8/2007 |

OTHER PUBLICATIONS

International Search Report PCT/US2006/034785 dated Apr. 4, 2007.
International Search Report PCT/US2007/084881 dated Mar. 25, 2008.
Co-pending U.S. Appl. No. 10/753,909, filed on Jul. 7, 2004.
Co-pending U.S. Appl. No. 10/889,855, filed on Jul. 12, 2004.
Co-pending U.S. Appl. No. 11/487,144, filed on Jul. 13, 2006.
Co-pending U.S. Appl. No. 11/941,050, filed on Nov. 15, 2007.
Co-pending U.S. Appl. No. 12/204,760, filed on Sep. 4, 2008.
Co-pending U.S. Appl. No. 121703,623, filed on Feb. 10, 2010.
Co-pending U.S. Appl. No. 11/437,357, filed on May 19, 2006.
Supplementary European Search Report 06 814 256 dated Mar. 31, 2010, pp. 1-7.
International Search Report PCT/US2009/054427 dated Mar. 17, 2010 pp. 1-3.
International Search Report PCT/US2010/023775 dated Oct. 11, 2010, pp. 1-3.
Final Office Action mailed Apr. 19, 2010 for U.S. Appl. No. 11/487,144, filed on Jul. 13, 2006.
Non-Final Office Action mailed Aug. 20, 2010 for U.S. Appl. No. 11/487,144, filed on Jul. 13, 2006.
Non-Final Office Action mailed Dec. 31, 2009 for U.S. Appl. No. 11/487,144, filed on Jul. 13, 2006.
Non-Final Office Action mailed Mar. 18, 2008 for Issued Patent No. 7,400,359, U.S. Appl. No. 10/753,909, filed Jan. 7, 2004.
Non-Final Office Action mailed Sep. 11, 2009 for Issued Patent U.S. Patent No. 7,710,501, U.S. Appl. No. 10/889,855, filed on Jul. 12, 2004.
Non-Final Office Action mailed Sep. 23, 2010 for U.S. Appl. No. 11/437,357, filed on May 19, 2001.
Notice of Allowance mailed Feb. 8, 2010 for Issued Patent No. 7,710,510, U.S. Appl. No. 10/889,855, filed on Jul. 12, 2004.
Notice of Allowance mailed May 30, 2008 for Issued Patent No. 7,400,359, U.S. Appl. No. 10/753,909, filed on Jan. 7, 2004.
Restriction Requirement mailed Feb. 25, 2010 for U.S. Appl. No. 11/437,357, filed May 19, 2006.
Written Opinion PCT/US2006/34785 dated Apr. 4, 2007, pp. 1-4.
Written Opinion PCT/US2007/084881 dated Mar. 25, 2008 pp. 1-4.
Written Opinion PCT/US2009/054427 dated Mar. 17, 2010 pp. 1-3.
Written Opinion PCT/US2010/023775 dated Oct. 11, 2010, pp. 1-5.
Office Action for European Application No. 06814256.1 mailed Jul. 16, 2010, 1 page.
Office Action for Canadian Application No. 2,620,820 mailed Aug. 18, 2010, 4 pages.
Notice of Allowance for U.S. Appl. No. 11/487,144 mailed Dec. 9, 2010, 4 pages.
Non-Final Office Action for U.S. Appl. No. 11/941,050 mailed Feb. 1, 2011, 24 pages.
Office Action for European Application No. 06814256.1 mailed Feb. 10, 2011, 4 pages.
Notice of Allowance for U.S. Appl. No. 11/437,357 mailed Mar. 9, 2011, 5 pages.
Notice of Allowance for U.S. Appl. No. 11/487,144 mailed Mar. 21, 2011, 5 pages.
Non-Final Office Action for U.S. Appl. No. 11/437,357 mailed Sep. 23, 2010, 8 pages.
Notice of Allowance for U.S. Appl. No. 11/437,357 mailed Dec. 1, 2010, 12 pages.
Notice of Allowance for U.S. Patent Application No. 11,941,050, Mailed Aug. 18, 2011, 10 pages.
International Preliminary Report on Patentability for International Patent Application No. PCT/US2009/054427, Mailed Mar. 17, 2011, 5 pages.

* cited by examiner

SOURCE-ADAPTIVE VIDEO DEINTERLACER

CROSS-REFERENCE TO RELATED APPLICATION

This Application claims the benefit of U.S. Provisional Application No. 60/715,711 entitled "Source-Adaptive Video Deinterlacer," filed on Sep. 8, 2005, which is incorporated by reference.

BACKGROUND

Interlaced scanning and progressive scanning are typical scanning methods employed in a video display device. Interlaced scanning has been employed in current National Television Systems Committee ("NTSC") television ("TV") systems. For the video display shown in FIGS. 1A-1C, even and odd fields would be interlaced sequentially and alternately on the screen when displaying a video image. For FIGS. 1A-1C, for interlaced scanning, the solid lines would represent lines being scanned at present, and the dotted lines would represent lines scanned for a preceding display.

Deinterlacing an interlaced signal provides numerous advantages for improving video quality. Specifically, deinterlacing can remove interlace motion artifacts, increase apparent vertical resolution, and reduce flicker. Furthermore, deinterlacing is often required because modern televisions are inherently progressive and the video feed is broadcast in interlaced form.

There are three common techniques for deinterlacing an interlaced video signal. A first deinterlacing technique is known as weaving. Weaving involves combining two adjacent fields into one frame. While this technique maintains vertical resolution, it has the problem of creating interlace motion artifacts if motion is present.

A second deinterlacing technique is known as vertical interpolation. Vertical interpolation involves averaging at least two scan lines to generate a new scan line. The technique is repeated for all scan lines and creates a full frame from a single video field. While vertical interpolation allows a progressive picture to be generated from one video field, half of the resolution of the video feed is lost.

Another deinterlacing technique is known as motion adaptive deinterlacing. For this technique, adjacent fields are merged for still areas of the picture and vertical interpolation is used for areas of movement. To accomplish this, motion, on a sample-by-sample basis, is detected over the entire picture in real time, requiring processing of several fields of a video signal.

To improve the results of the common techniques, a cadence detection algorithm can be implemented. In order for the progressive source to be converted to an interlaced format, each frame from that source must be represented as multiple fields in the interlaced format - i.e., a single frame is converted to 2or more interlaced fields. The conversion process (called telecine) typically results in a regular repeating pattern of fields taken from an original progressive frame. For example, to convert 24 frame/sec film to 60 field/sec interlaced video, a technique known as 3:2 pulldown is used. The technique converts one film frame to 3 fields, the next frame to 2 fields, the next to 3, etc. The result is a regular 3/2/3/2 repeating pattern, or cadence, which can be detected. If the cadence is known, then the original film frame can be reconstructed by simply combining the correct two fields in a weaving operation. However, cadence detection systems are inadequate because they are generally limited to 3:2 pulldown or 2:2 pulldown. Further cadence detection systems incur a number of problems when the cadence pattern is broken for some reason, such as video edits.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for deinterlacing an interlaced video stream involves the detection and merging of fields. An example of a method according to the technique involves detecting an occurrence of groups of adjacent fields that are derived from a common original image frame source. Field pairs of the interlaced video stream can be merged to form a deinterlaced signal.

In certain embodiments, the detection of an occurrence of groups of adjacent fields that are derived from a common image frame source can involve determining if fields pairs of the interlaced video stream are similar. If the fields pairs are similar, the field pairs can be merged. If more than two adjacent field pairs are different, an alternate deinterlacing technique can be implemented, such as motion adaptive deinterlacing.

In some embodiments, determining if field pairs are similar can involve performing a correlation operation between field pairs. In other embodiments, a difference operation between field pairs can be performed. Additional embodiments can determine whether a scene transition occurred in order to aid in the determination of similar and different field pairs. An alternate embodiment can involve calculating a threshold value based on one or more factors. Following this embodiment, the factors can include a history of correlation operation values between field pairs, a minimum and maximum value in the history of correlation operation values, a minimum and maximum value for a range of correlation values, detecting scene transitions, and assigning state values.

Another example a method according to the technique involves detecting an occurrence of groups of consecutive temporal fields of interlaced video fields that are derived from a common original image frame source. A repeating pattern in the groups can be detected and locked. Fields pairs can be combined based on the repeating pattern.

The proposed method and device can offer, among other advantages, improved quality of deinterlaced video. This can be accomplished in an efficient and robust manner compared to other deinterlacing techniques because a cadence can be detected independent of the source. These and other advantages of the present invention will become apparent to those skilled in the art upon a reading of the following descriptions and a study of the several figures of the drawings.

BRIEF DESCRIPTION

Embodiments of the inventions are illustrated in the figures. However, the embodiments and figures are illustrative rather than limiting; they provide examples of the invention.

FIGS. 1A-1C show a video display with screen lines.

FIG. 2 schematically illustrates the conversion of two consecutive interlaced fields into a single progressive frame.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

A method is described for source adaptive deinterlacing of an interlaced video signal to create a progressive video signal. As described further below, the method includes determining if a sequence of two or more fields from the interlaced source is derived from the same original progressive source frame. One method of determining if a sequence of two fields have a common source is to determine how similar the two fields are to each other. The more similar the two fields are to each other, the more likely it is that they have been taken from the same original source frame. Once it has been determined that two fields come from the same original source frame, they can be merged to reconstruct the original source frame.

According to certain embodiments of the present invention, the method of deinterlacing by determining if two fields have a common source can recognize and adapt to any cadence or cadences in the video signal. Further, once it has been determined that two fields come from the same original source frame, they can be merged without need of any further processing, such as calculating pixels.

Figure 1A:
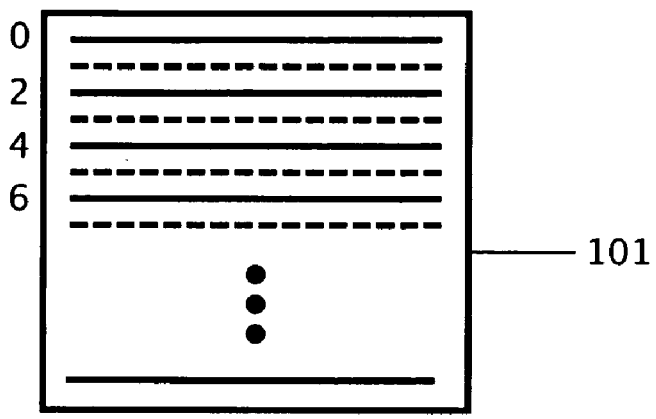
Figure 1B:
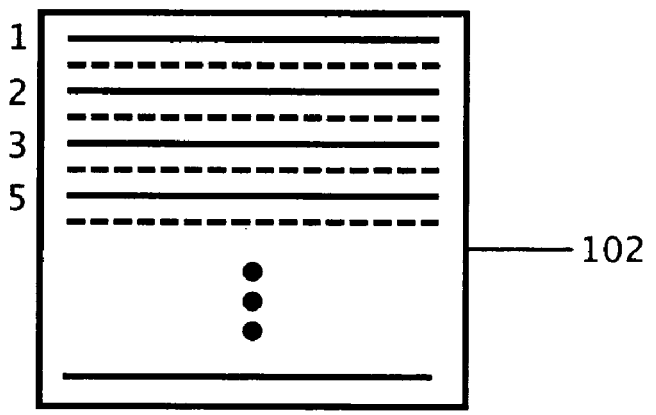
Figure 1C:
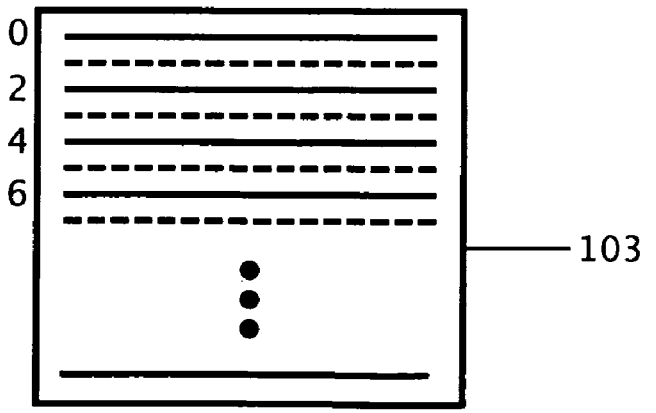
Figure 2:
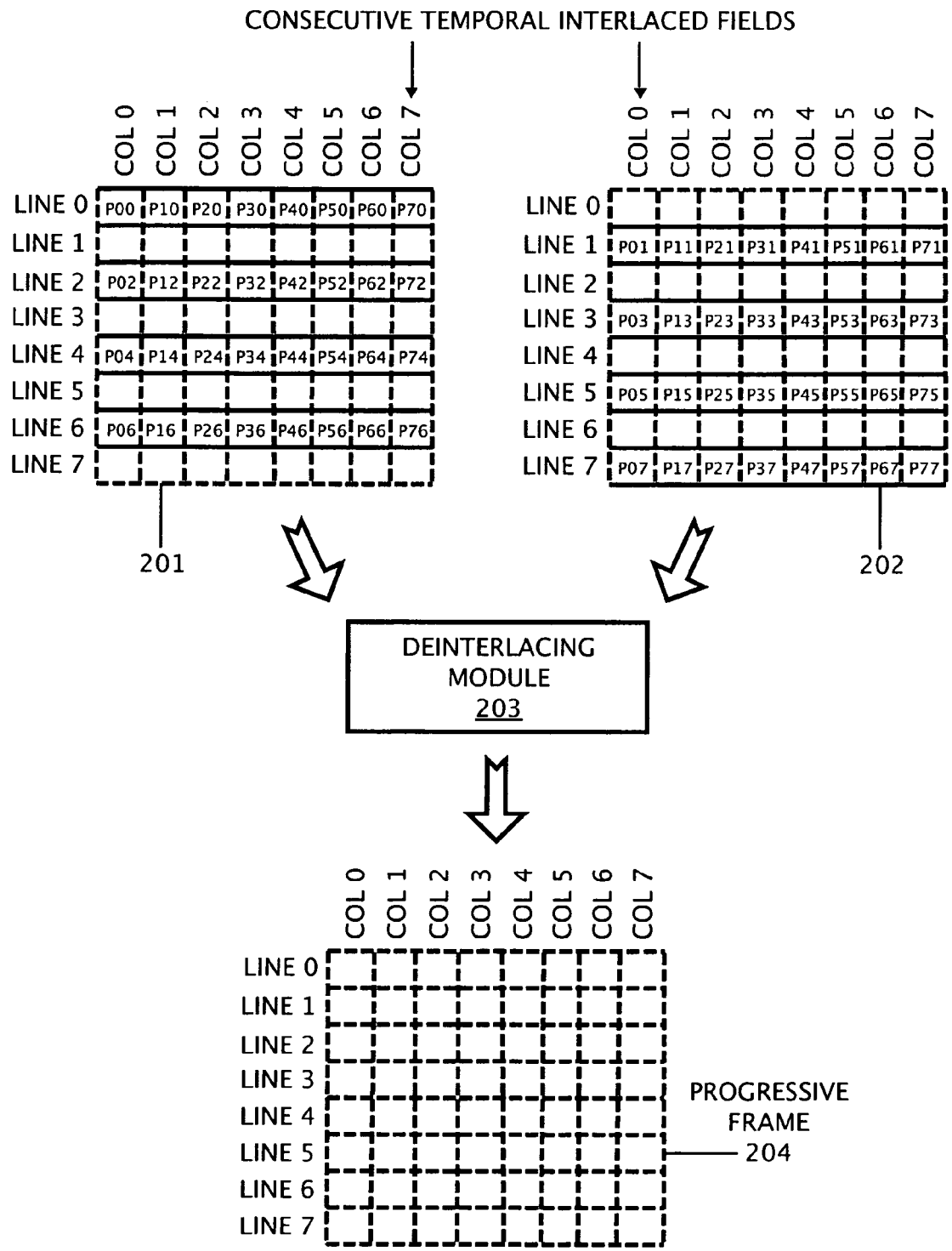

FIG. 2 illustrates a deinterlacing module 203 that converts two temporal interlaced fields 201 and 202 into a progressive frame 204. The interlaced field 201 is an even field because it only includes lines 0, 2, 4, and 6. The interlaced field 202 is an odd field because it only includes lines 1, 3, 5, and 7.

For the example of FIG. 2 and subsequent figures, interlaced fields are shown as being relatively small for clarity. For example, the interlaced fields are illustrated as being composed of 4 lines of 8 pixels, while the progressive frames are illustrated as being composed of 8 lines of 8 pixels. Nevertheless, typical interlaced fields and progressive frames will be many times larger than the example interlaced fields and progressive frames used in the figures and in this description. The smaller example fields and frames are used herein for clarity in describing the key principles of embodiments of the present invention. Embodiments of the present invention are not limited to any particular size of interlaced field or progressive frame.

Figure 3:
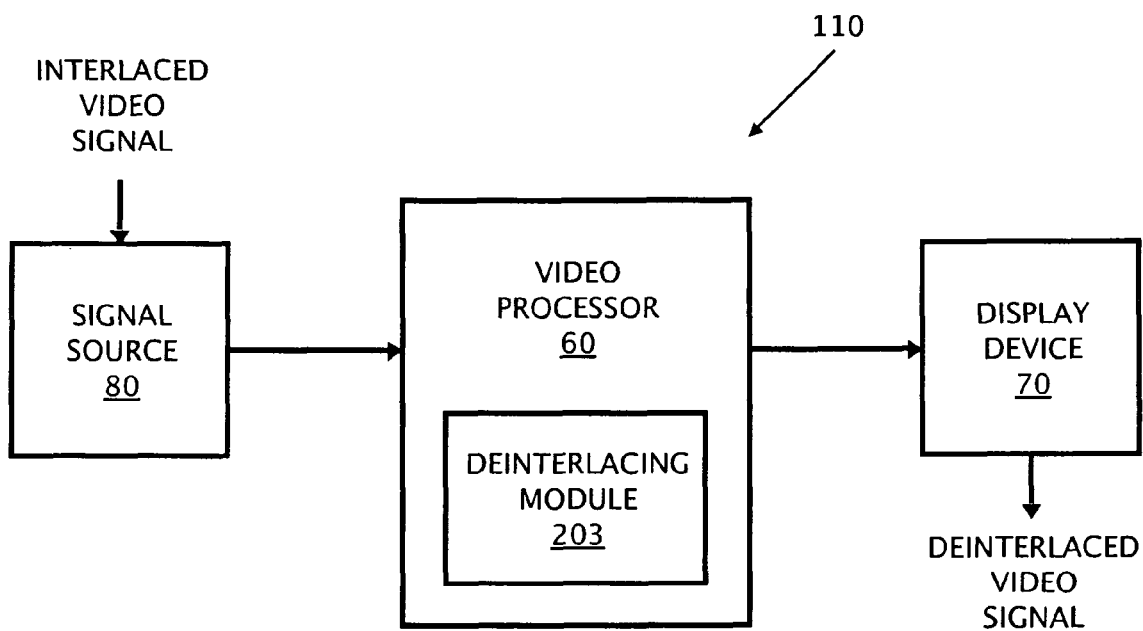
FIG. 3 illustrates a video system.

The deinterlacing module 203 of FIG. 2 may be part of a video system, such as the video system 110 of FIG. 3. Video system 110 includes a video processing system 60, a video display device 70 and a signal source 80. Video processing system 60 may include one or more programmable general-purpose or special-purpose microprocessors, digital signal processors ("DSPs"), programmable controllers, field programmable gate array ("FPGAs"), application-specific integrated circuits ("ASICs"), programmable logic device ("PLDs"), or the like, or a combination of such devices. The deinterlacing module 203 may be, for example, implemented in a PLD, a FPGA, an ASIC or other type of circuitry or device. Alternatively, or in addition, the deinterlacing module 203 may be one of the application programs and/or other program modules which may be loaded into system memory of processing system 60 in preparation for execution by processors of the processing system 60. For one embodiment, deinterlacing module 203 is part of video processor 60.

Processing system 60 includes a signal input that receives a video signal from a signal source 80. Signal source 80, may be either a single channel signal. source or a multiple channel signal source. A single channel signal source provides programming from a recorded medium, such as a videocassette, compact disc, DVD, etc. Examples of a single channel signal source include a videocassette recorder, a CD player, and a DVD player. A multiple channel signal source includes any system or device that is capable of sending a signal that may be received by a satellite receiver, a cable or optic connection, a terrestrial antenna, or the like. Examples of a multiple channel signal source include Digital Satellite System ("DSS"), Digital Video Broadcasting ("DVB"), a cable box, locally broadcast programming (i.e. programming broadcast using Ultra High Frequency ("UHF") or Very High Frequency ("VHF"), and so forth.

The output of video processor 60 goes to a video display device 70, such as an HDTV, a standard definition TV, a computer monitor, etc. The display 70 can employ various display techniques, such as a plasma display, a cathode ray tube ("CRT"), a LCD display, a DLP display, and a projector, for example.

A video processor 60 employing a deinterlacing module 203 receives an interlaced video signal from video signal source 80 and provides a deinterlaced signal to display device 70.

For alternative embodiments, the deinterlacing module 203 can be part of the video signal source apparatus 80 or the video display device 70. For alternative embodiments, the video processor 60 can be part of the video signal source 80 or the video display device 70.

Figure 4:
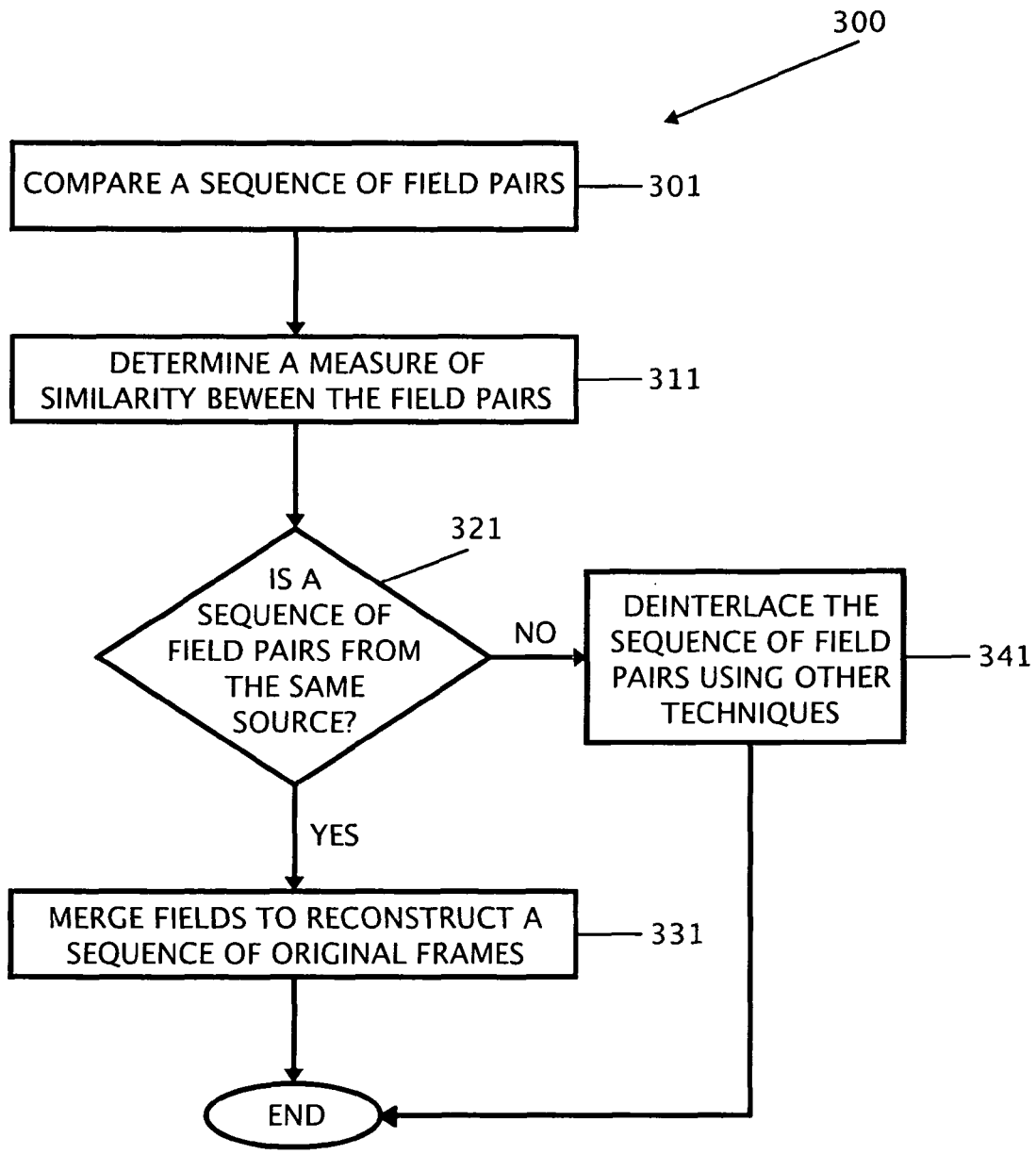
FIG. 4 is a flowchart of a method for converting a sequence of consecutive interlaced fields into a sequence of progressive frames.

FIG. 4 is a flowchart of an overall method 300 of converting a sequence of temporally consecutive fields of interlaced video signal (e.g., fields 201 and 202 of FIG. 2) into a sequence of progressive frames of video data. The method involves detecting in an interlaced video stream the occurrence of groups of adjacent fields that are derived from the same original video image frame so that the original video image frame may be reconstructed by merging the fields. The detection is done by comparing a pair of fields at block 301, determining a measure of similarity or difference between the fields at block 311, and determining if the fields are derived from a common source frame at block 321. If there is a high level of confidence that the fields are derived from a common source frame, then pairs of fields can be merged to reconstruct the original source frame at block 331. Otherwise, the two fields are deinterlaced using other techniques at block 341.

Method 300 utilizes the observation that the more similar two or more fields are to each other, the more likely they are to have been taken from the same original video image. The method 300 also utilizes the fact that conversion of a slower frame rate progressive source to a faster frame rate interlaced format requires that multiple sequential fields be taken from the same original source frame. In other words, there will be a sequence of adjacent fields that are all taken from the same source frame.

Figure 5:
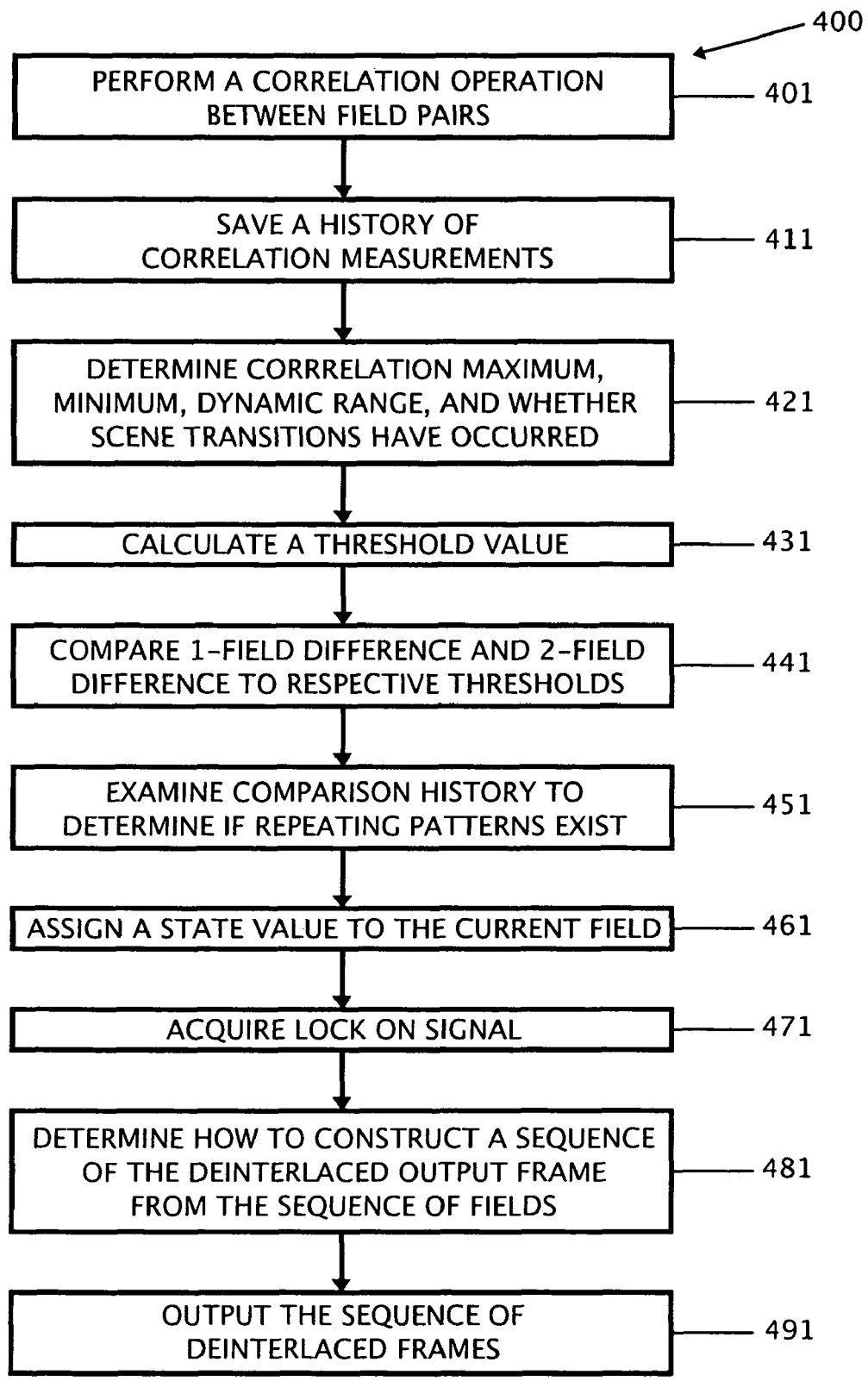
FIG. 5 is a flowchart of a method for converting a sequence of consecutive interlaced fields into a sequence of progressive frames.

FIG. 5 is a flowchart of a method 400 of converting a sequence of temporally consecutive fields of an interlaced video signal (e.g., fields 201 and 202 of FIG. 2) into a sequence of a progressive video signal. At block 401, in order to determine how similar two fields are to each other, a correlation operation is performed on a field pair. Accordingly, a correlation operation may be performed on two fields that are spaced one field apart. This operation is herein known as "1-field operation." Alternatively, a correlation operation may be performed on two fields that are spaced two fields apart. This operation is herein known as "2-field operation." According to certain embodiments of the invention, both the 1-field operation and the 2-field operation may be calculated.

According to embodiments of the present invention, a correlation operation may be performed on two fields that are spaced "x" fields is apart, where x>0. However, performing a correlation operation on fields that are in the vicinity of each other, for instance, are spaced 1 or 2 fields apart, is more useful and reliable, because it provides a more frequent indication of any changes in field data.

The 2-field operation compares fields that are spatially coincident. Thus, for an even-odd sequence of fields, the fields being compared are both composed of either even-numbered lines or odd-numbered lines. Accordingly, a 2-field difference. The magnitude of the pixel calculating a pixel-by-pixel difference to obtain a 2-field difference. The magnitude of the pixel difference values can be summed over the entire field, with the resultant sum indicating how different or similar the two fields are overall. A low resultant sum value indicates very similar fields while a high resultant sum value indicates very different fields. The terms "low" and "high", as well as "similar" and "different" as used herein, are, of course, relative.

The 1-field operation involves comparing two fields that are not spatially coincident—i.e., for an even-odd sequence of fields, one field is composed of even-numbered lines while the other is composed of odd-numbered lines. Thus, because the two fields are not spatially coincident, they cannot be directly compared. In addition, there may be aliasing present in a single field due to the fact that taking only every other line of a source video image may not generate a high enough vertical sampling rate to represent all the vertical high frequencies in the video signal. The aliases are different between the two fields being compared, causing yet another difference between them.

From each field a comparison field is created by phase-shifting one field up and the other down. For one embodiment, one field is phase-shifted ¼ line up and a field to be compared ¼ line down. The phase shift can be performed for instance, using a Finite Impulse Response ("FIR") filter approach, although other techniques such as simple linear interpolation can also be used. For this embodiment, a comparison field is created from each field by computing pixels from the pixels of each field and comparing the calculated pixels. Additionally, a comparison field can be created from one of the two fields by computing pixels from the pixels of that field and the resultant calculated pixels can be compared with the pixels of the other field. The resulting field can be compared with an original field in the same manner as used for the 2-field difference described above.

In general, however, the 1-field difference has a higher baseline or noise level than the 2-field difference due to the fact that the original two fields being compared are not spatially coincident. Therefore, one or more operations may also be performed on each of the two original fields before the phase shift to reduce noise and aliasing artifacts. One such operation is a vertical low-pass filtering operation.

Figure 6:
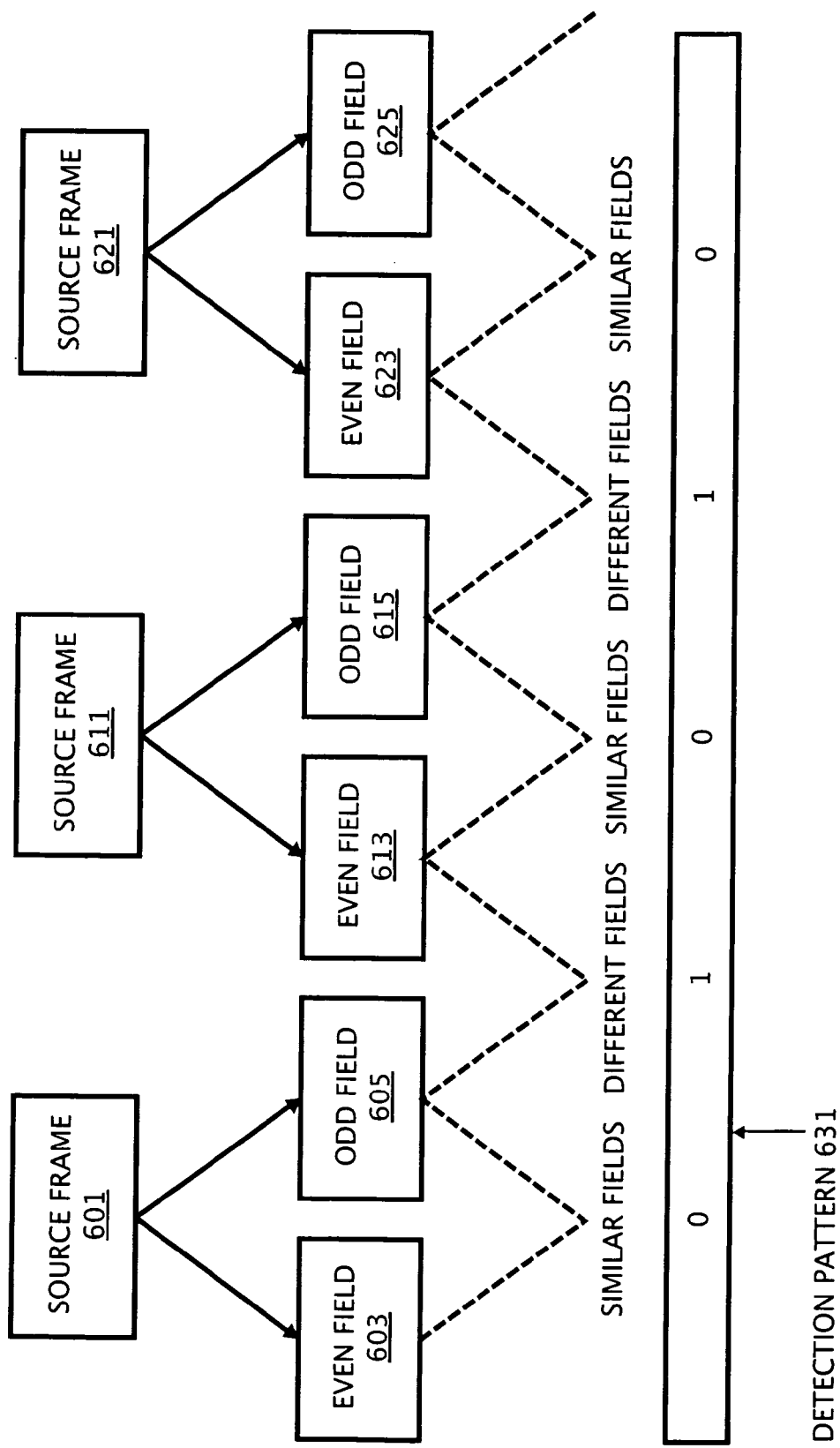
FIG. 6 illustrates the utility of using a 1-field difference for a 2:2 pulldown.
Figure 7:
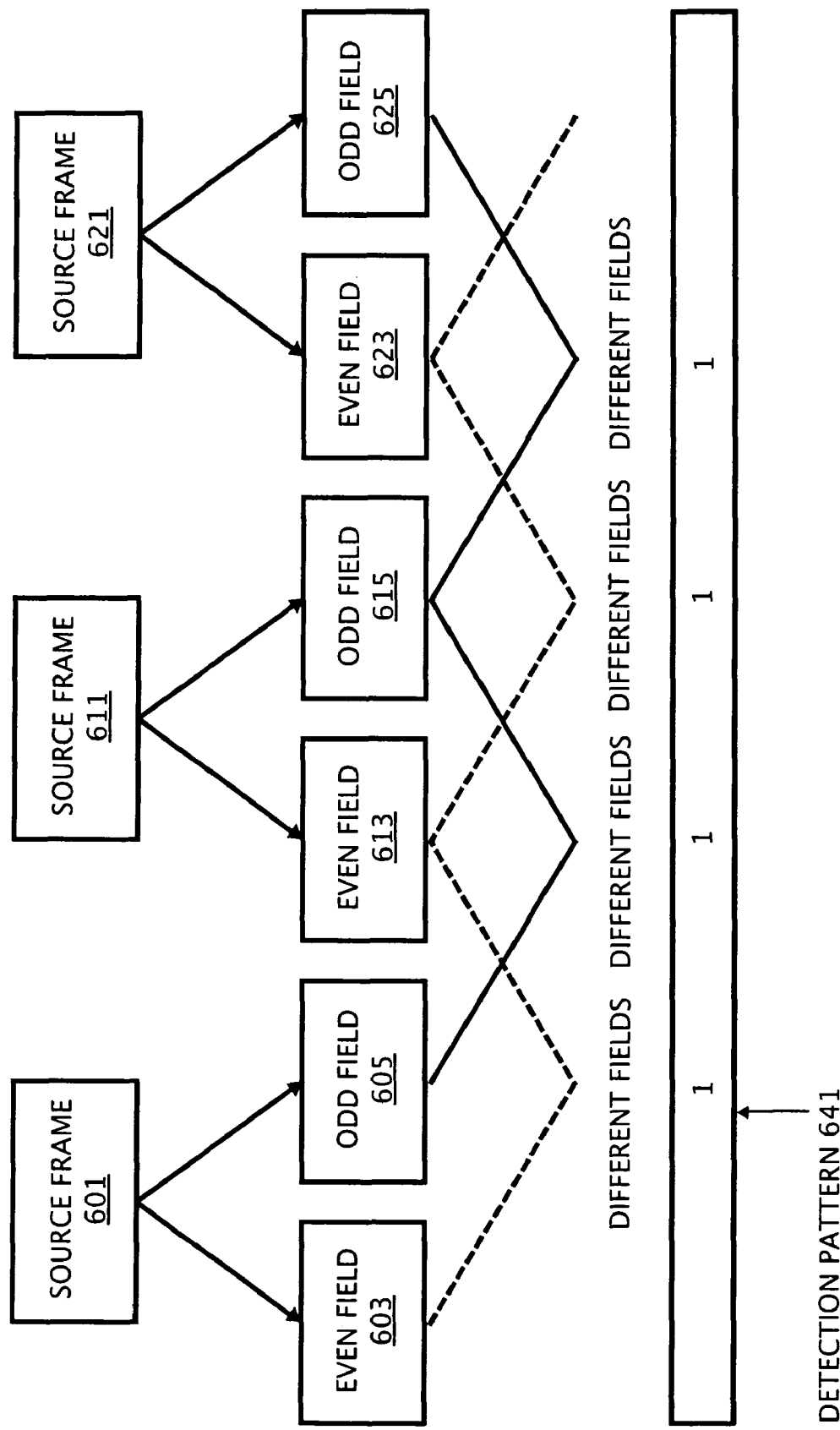
FIG. 7 illustrates the lack of utility of using a 2-field difference for a 2:2 pulldown.

According to certain embodiments of the invention, both the 1-field difference and the 2-field difference may be calculated. The 2-field difference provides useful measurements when used on certain cadences, like 3:2 pulldown, but is not very useful when used on a cadence that has only two fields taken from the same frame, such as 2:2 pulldown. FIG. 6 illustrates a pattern 631 detected by using a 1-field difference for a 2:2 pulldown. FIG. 7 illustrates that by using a 2-field difference for a 2:2 pulldown, a detected pattern 641 actually shows no repeating pattern. For both FIGS. 6 and 7, progressive scan source frames 601, 611, and 621 are converted respectively into interlaced video field pairs 603 and 605, 613 and 615, and 623 and 625. A 1-field difference of the fields displays a detection pattern of 0-1-0-1-0, where a "0" represents that the "1" represents that the two fields being compared are different to each other. A 2-field difference of the fields displays a detection pattern of 1-1-1-1-1. Thus, a 2-field difference for a 2:2 pulldown always conveys that the fields are different to each other, and therefore, in contrast to the 1-field difference does not provide much valuable information about the fields or the cadence.

Figure 8:
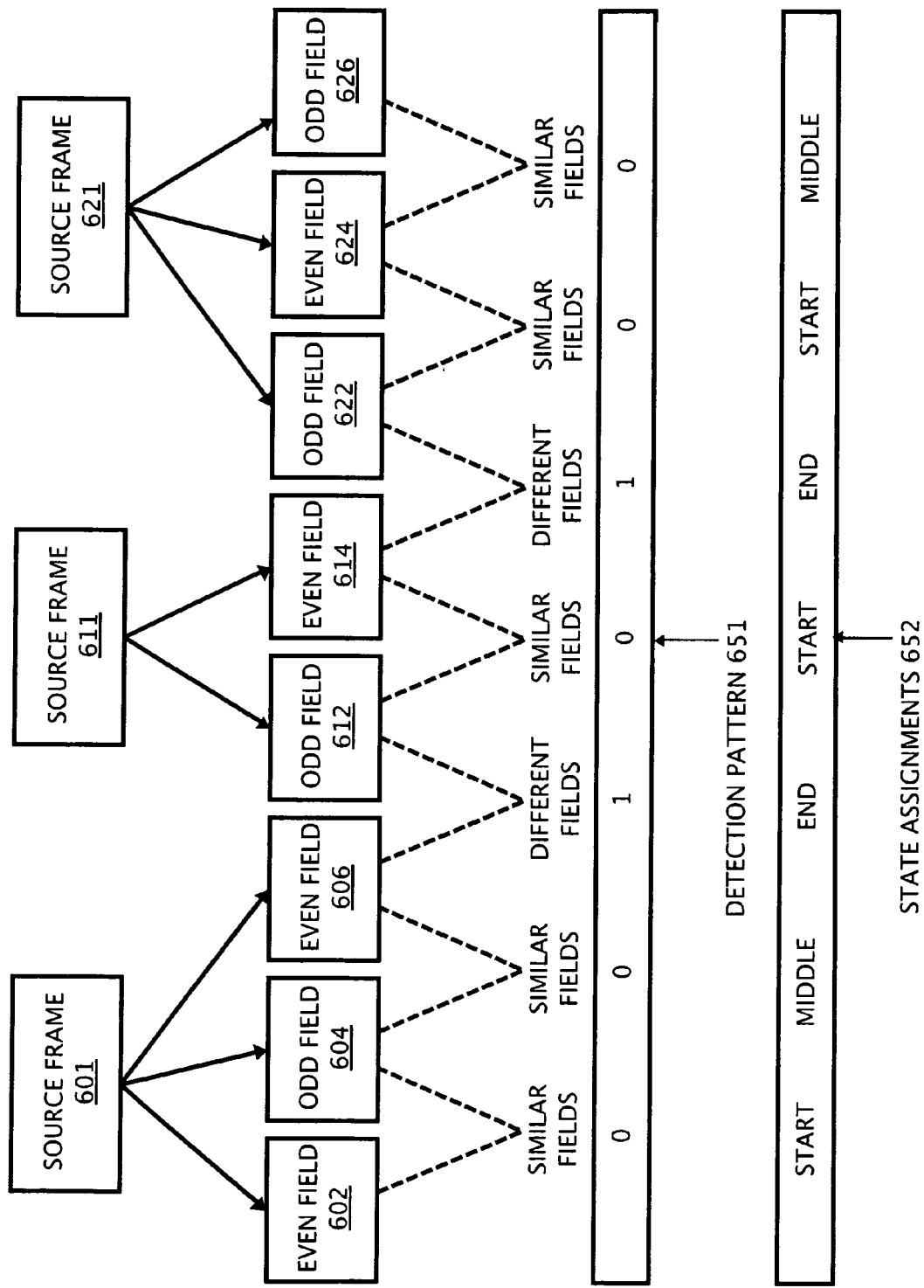
FIG. 8 illustrates the utility of using a 1-field difference for a 3:2 pulldown.
Figure 9:
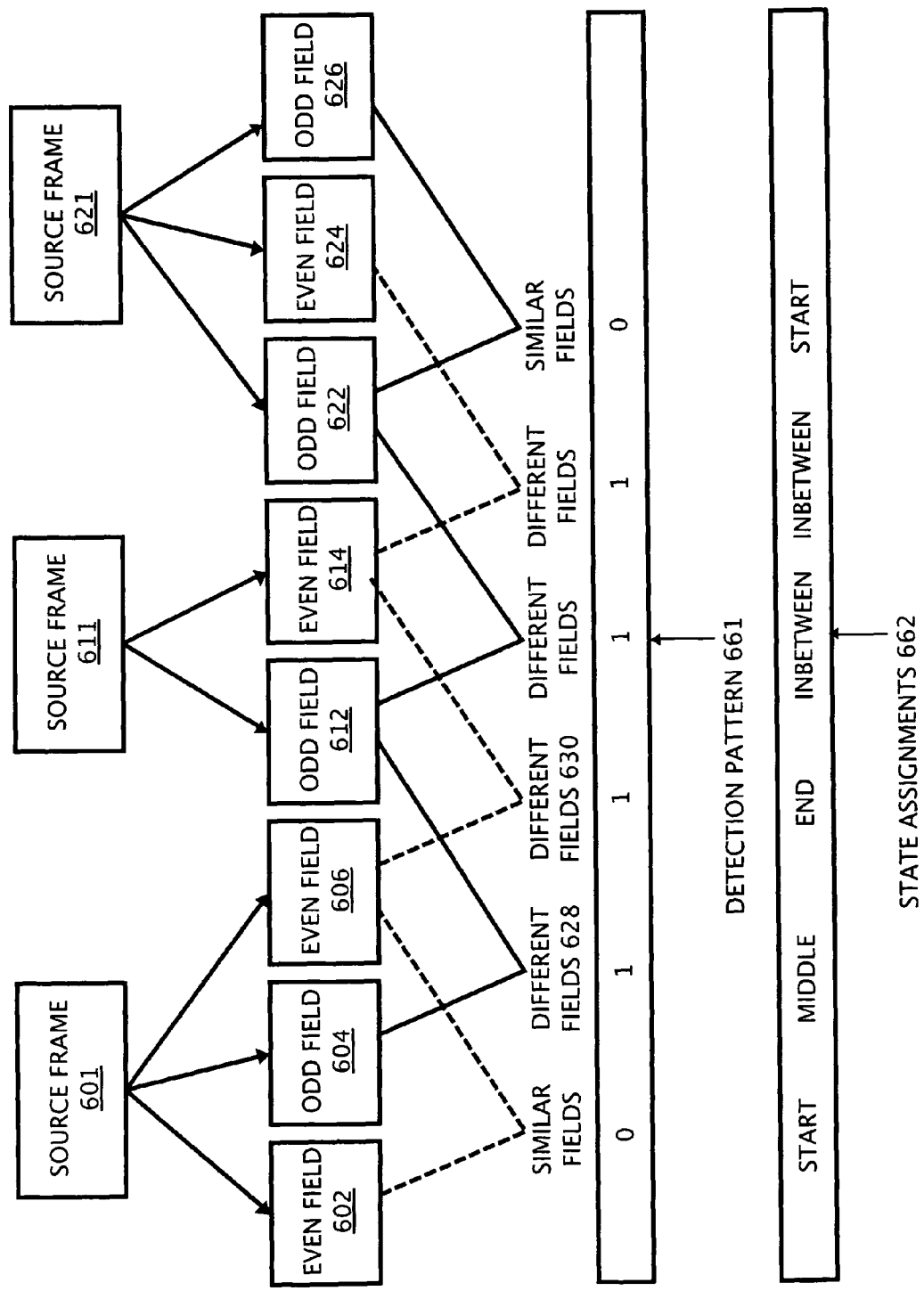
FIG. 9 illustrates the utility of using a 2-field difference for a 3:2 pulldown.

On the other hand, as illustrated in FIGS. 8 and 9, both 1-field difference and 2-field difference operations are suitable for use on a 3:2 pulldown video sequence. FIG. 8 illustrates a pattern 651 detected by using a 1-field difference for a 3:2 pulldown. FIG. 9 illustrates a pattern 661 detected by using a 2-field difference for a 3:2 pulldown. For both FIGS. 8 and 9, progressive scan source frames 601, 611, and 621 are converted respectively into interlaced video field groups 602, 604, and 606; 612 and 614; and 622, 624 and 626. A 1-field difference of the fields displays a repeating detection pattern of 0-0-1-0-1. A 2-field difference of the fields displays a repeating detection pattern of 0-1-1-1-1. Thus, both the 1-field and 2-field difference for a 3:2 pulldown provide useful information.

In the description of FIG. 5, while both 1-field and 2-field correlations are calculated and used, it is possible to perform the source-type detection based on only one of these measurements. Using both measurements together may result in a much more reliable detection of similar fields.

At block 411 of FIG. 5, a history of the correlation measurements or values is saved. For one embodiment, the history of the correlation measurements is saved in a history buffer. When a new pair of frame correlation values is available at the end of each field period, the oldest values in the history record are discarded and the new values are added. According to certain embodiments of the present invention, correlation history measurements are saved over time for "n" frame periods. Thus, for both the 1-field and 2-field difference frame sums, a history is kept of the most recent "n" frame periods. For one embodiment, the value of n is chosen based on the longest cadence period that is desirable to detect. Thus, for 3:2 pulldown, a value of n can be 5, which represents the maximum cadence period length.

Figure 10:
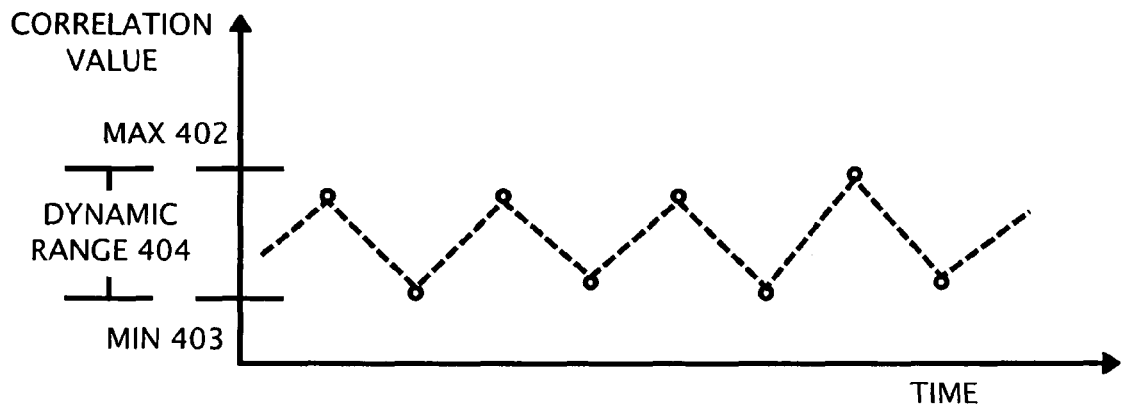
FIG. 10 is an illustration of correlation values of temporally consecutive fields over time.

Based on the saved history, at block 421 of FIG. 5 the following calculations can be made: local correlation maximum and minimum values, the dynamic range of the correlation values, and whether scene transitions occur within the vicinity of the current field or in the history range. As illustrated in FIG. 10 a local correlation maximum value 402 is the maximum value of the difference frame sums, while a local correlation minimum value 403 is the minimum value of the difference frame sums. The dynamic range 404 of the correlations values is a difference between the maximum and minimum correlation values in the history range.

For one embodiment, new correlation values are adapted before being saved in the history. For instance, if a new correlation value is much larger than the maximum value currently in the history buffer, then the new value will be reduced in amplitude to avoid abnormally skewing the history data. A correlation value can be much higher than a maximum value due to noise, momentary changes in the image data, or a scene transition. If a long term increase in the correlation value is actually present, the history values will adjust over time to match the incoming values.

Figure 11:
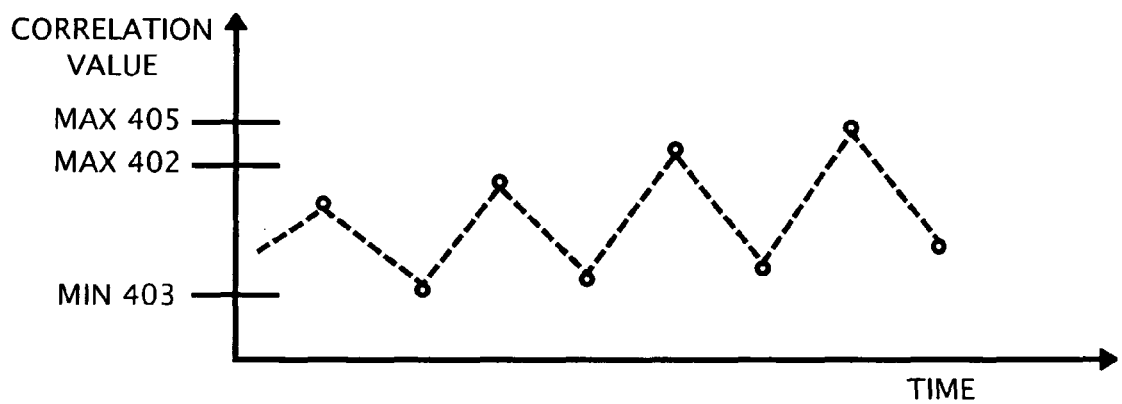
FIG. 11 is an illustration of correlation values of temporally consecutive fields over time.
Figure 12:
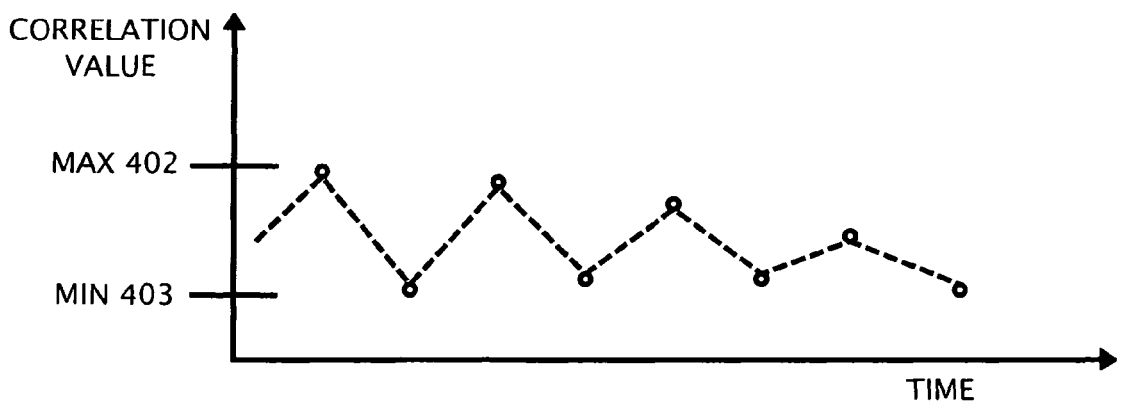
FIG. 12 is an illustration of correlation values of temporally consecutive fields over time.

Once new correlation values have been added, the updated history record is examined to determine the minimum and maximum correlation values. The sequence of history values is also examined to determine if the higher values (which represent fields which are from different source frames) have a decreasing trend, or if the lower values (which represent fields which are from the same source frame) have an increasing trend. Higher maximums and lower minimums are tracked by their very nature, but a downward maximum or upward minimum trend must be consciously tracked. For instance, as shown in FIG. 11, an upward maximum trend is tracked because a new local maximum 405 is greater than the previous local maximum 402. However, as shown in FIG. 12, a downward maximum trend is not tracked by its very nature, because the local maximum 402 does not change. This tracking can be done for maximums by looking at the sequence of history values for which the threshold comparison (as described below) yield a "1"(or "different") value, and is done for minimums by looking at only the history values for which the threshold comparison yields a "0"(or "similar") value. When such a trend is identified, the minimum and/or maximum values provided as outputs for subsequent processing steps can be set to the most recent value in the trend as opposed to the absolute minimum and/or maximum in the history record.

As discussed above, the 1-field difference measurement has a higher baseline value than the 2-field difference due to the fact that a pair of fields will almost never perfectly correlate. According to certain embodiments of the present invention, a method to compensate for this discrepancy is provided. A multiple of the minimum value in the history record is subtracted from both the minimum and the maximum values before they are provided as outputs. A larger multiple is used when the dynamic range value is high and a multiple of 1 is used when the dynamic range is low. One net result of this is that the output minimum is always zero.

Figure 13:
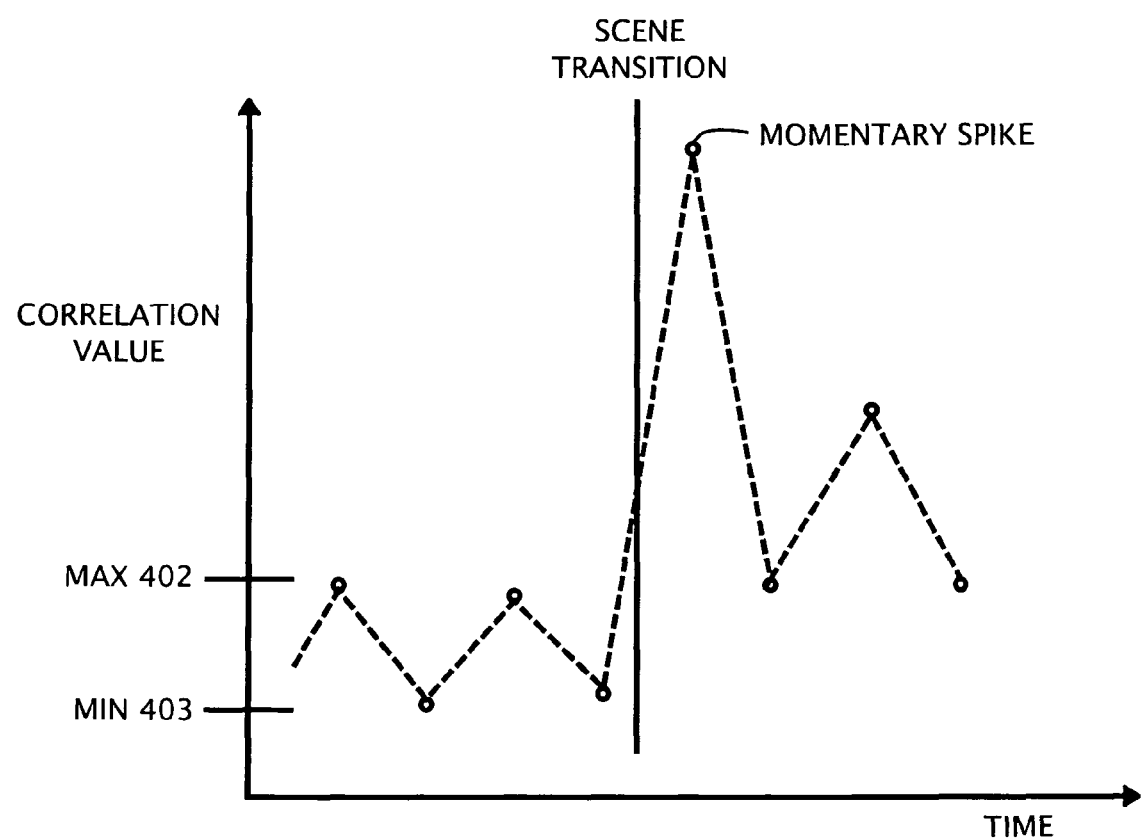
FIG. 13 is an illustration of correlation values of temporally consecutive fields over time.

In addition, scene transition occurrences in a video sequence can also be detected. A scene transition normally results in a momentary spike, as illustrated in FIG. 13, in both the 1-field difference and the 2-field difference values. Detecting the scene transition is important so as to prevent the history values from being artificially skewed upwards, and also to identify that a change in correlation level may be occurring. A scene transition can result in significant changes in the overall video image content, and this can manifest as very different minimum, maximum, and dynamic range values. Furthermore, the scene transition detection information is passed on to subsequent processing stages so that any such changes can be taken into account.

At block 431 of FIG. 5, based on the correlation history measurements, a threshold value is calculated. If the correlation value is above the threshold, then the fields are different. If the correlation value is below the threshold the fields are considered to be similar. The threshold value calculation is based on a number of factors, such as the minimum and maximum correlation values from the correlation history, the presence or absence of a scene transition, and the presence of a downward trend in the history maximum values. The threshold value is a dynamic value that changes from field to field.

Threshold values for 1-field operations and 2-field operations are calculated slightly differently. For one embodiment, for both operations, the threshold value is a fraction of the dynamic range and is calculated by using the following equation: [Dynamic Range/Scaling Factor]+Minimum. The scaling factor varies depending on various factors.

The scaling factor for calculating the threshold for the 1-field operation depends largely on the size of the maximum. Because the 1-field minimum is always zero, the maximum is effectively the same as the dynamic range. Larger maximum values cause a larger scaling factor to be used, with a nominal range of 6 to 64. The threshold is biased towards the minimum rather than the middle of the range for two primary reasons. First, the larger correlation values tend to vary more than the minimums, and secondly, because it is better to incorrectly decide that two fields are different than to incorrectly decide that they are the same. In the event of a scene transition, the threshold is decreased to prevent false detections when the transition is from a higher average motion level to a lower average motion level. In such a case, a false detection would indicate that fields are similar when they are really not, resulting in interlace motion artifacts being present in the deinterlaced video signal. If a downward maximum trend is present, then a transition has no effect on the threshold calculation because the threshold level will already have been depressed by the decreasing maximum values.

The 2-field threshold scaling factor is also calculated as a fraction of the 2-field difference dynamic range. The calculation rules are a bit different, however, as the minimum is often not zero and more truly represents the difference between the 2 fields. When the minimum is very small, then the dynamic range scaling factor is chosen based on the minimum amplitude. For larger minimums, the threshold scaling factor is a fixed value. Like the 1-field difference threshold, the 2-field threshold is depressed in the event of a scene transition.

At block 441, the 1-field difference and 2-field difference values are each compared to their respective thresholds. If the difference value is above the threshold, the result is a "1"(or "different") and if it is below the threshold, the result is a "0"(or "similar"). A history of the comparison results for both 1-field and 2-field differences is maintained for a set number "m" of previous field periods. For one embodiment, m is equal to at least two times n, because to recognize a repeating pattern, at least two instances of the pattern need to be present. The comparison history may be saved in a history buffer.

At block 451 of FIG. 5, the comparison history is examined to determine if repeating patterns exist. Many such patterns are indicative of a transfer from a progressive source format to an interlaced one. The most common are known as 3:2 pulldown and 2:2 pulldown. Many other cadences exist, although they are in less common use than the two already cited.

Examples include 2:3:3:2, 2:2:2:4, 3:2:3:2:2, 3:3, 5:5, 6:4 and 8:7. The 3:2 pulldown comparison pattern repeats every five field periods for both the 1-field difference and the 2-field difference. The 2:2 pulldown comparison pattern repeats every two field periods, but only for the 1-field difference, because the 2-field difference fails in this case. Thus, for instance, a comparison pattern of 0-1-0-1-0- . . . using a 1-field difference indicates a 2:2 pulldown. According to certain embodiments of the present invention, all cadences are tested from repeating every two field periods to repeating every fifteen field periods. The detected cadence or cadences are presented as output for subsequent processing steps.

At block 461 of FIG. 5, based on the history of the comparison values, as well as the dynamic range value of the correlation values, a state value is assigned to the current field. This is done for both the 1-field and 2-field correlation histories. For one embodiment, a state value includes the values of "Start", "Middle", "End" or "None." The "Start" state indicates that a repeated sequence of fields from the same frame is just beginning. The "End" state indicates that the repeated sequence is ending. The "Middle" state indicates that the current field is between the beginning and end of the repeated sequence. The "None" state indicates that no repeated sequence is deemed to be present. As shown in FIG. 8, the repeating state assignments 652 for 1-field difference for a 3:2 pulldown is Start/Middle/End/Start/End.

The basis of the state value assignment is the observation that conversion of a slower frame rate progressive source to a faster frame rate interlaced format requires that multiple sequential fields be taken from the same original source frame. In other words, there will be a sequence of adjacent fields that are all taken from the same source frame. Such a sequence must have a first field and a last field, and may have one or more middle fields.

The possible state values are therefore "Start", "Middle", and "End" when a repeating sequence exists. When no repeating sequence exists a state value of "None" is used. Because the 3:2 pulldown technique is very common, and because a 2-field difference is a very reliable indicator of such a pattern, an additional state assignment can be made to cover the two field periods not handled by the other states for the 2-field difference pattern. This state assignment is termed "InBetween." Thus, as shown in FIG. 9, the repeating state assignments 662 for a 2-field difference pattern with a 3:2 pulldown source would be Start/Middle/End/InBetween/InBetween.

The state assignments are based on the comparison history as well as the previous state values. The following is a non-exhaustive list of examples of state assignment:

TABLE 1

| Field Operation | Current Comparison | Previous Comparison | Previous State | State |
| --- | --- | --- | --- | --- |
| 1-field | 0 | 1 | End or None | Start |
| 1-field | 1 | 0 | Start or Middle | End |
| 2-field | 0 | 1 | None, InBetween, or End | Start |

The state assignments are used to determine which fields to use to create the progressive video sequence, as described below.

According to certain embodiments of the present invention, other factors may be also used in determining the presence or absence of a repeating field sequence. One such factor is a "pair quality metric." This metric can be assigned when two sequential 2-field difference comparisons are made of fields that come from different original source frames. In such a case, one 2-field difference value is a comparison between the even field of original source frame "N" and the even field of original source frame "N+1", while the other is a comparison of the odd fields of those two source frames. For instance, referring to FIG. 9, the 2-field difference value 628 is a comparison between the odd field 604 of original source frame 601 and the odd field 612 of original source frame 611, while the 2-field difference value 630 is a comparison between the even field 606 of original source frame 601 and the even field 614 of original source frame 611. Because both 2-field differences 628 and 630 are comparing the same two original source frames (601 and 611), their values will be very similar. If they are not similar, then either the fields being compared are not from just two source frames, or there is a problem of some type with the video signal. Based on the similarity of the two 2-field difference values, a quality metric can be assigned to the measurement. Thus, the method 400 of FIG. 5 determines, when performing two sequential 2-field correlations of fields which come from different original source frames, if the 2-field correlation values are consistent with even/even and odd/odd field comparisons from 2 original source frames.

The pair quality metric is only assigned when the 1-field and/or 2-field state values indicate that the current and previous 2-field difference values were each comparing at least one field from the same source frames. This second of the pair of 2-field difference values occurs when the state is determined to be "End", and the first of the pair occurs in the previous field period. The magnitude of the difference between the pair of 2-field difference values is compared to the larger of the two values. Based on the comparison result, a quality value (e.g., very good, good, medium, bad, very bad) is assigned to that pair.

At block 471, based on the correlation history, state, any detected cadence, dynamic range quality, pair quality and scene transition values, the method determines if a lock can be acquired on the signal. A lock is considered to have occurred on the signal when the indicators as a whole provide a high confidence that a field sequence has come from a progressive source by extracting multiple fields from each original source frame. In other words, the signal has been recognized as having a valid repeating-field pattern and field pairs can be combined to deinterlace the video signal. A lock can be acquired on a sequence as long as a repeating pattern is detected, regardless of what the pattern actually is.

In order for lock to occur, a repeating pattern must exist. Ideally, the 1-field and 2-field difference values both agree on the pattern type. In certain cases, only one of these is required for lock as long as other quality metrics are sufficiently high. Once lock has initially occurred, the system stays in lock until some other event causes lock to be cleared. In general, it is harder to acquire lock than to lose it. The basic idea is that there needs to be a high confidence in the signal before lock is set and field pairs are combined to form the output, but that once lock has occurred, many types of variations in the sequence pattern can be tolerated. Once the system is in lock the cadence does not need to remain constant and could, for example, change back and forth between common patterns such as 3:2 or 2:2 pulldown without losing lock.

Some factors which could cause loss of lock include scene transitions which cause the 1-field state to become "None," or both state values being "None," or very poor quality metrics, or conflicting 1-field and 2-field state values. Recognized cadences that can cause lock to be acquired are 2:2, 3:2, 3:3, 4:4, 5:5, 4:2, 2:2:2:4, 2:3:3:2, 3:2:3:2:2, 6:4 and 8:7.

At block 481 of FIG. 5, method 400 determines how to construct the deinterlaced output frame from the sequence of fields based on the state value assigned to the field. Accordingly, the current and previous fields are combined if the current field is at the start or in the middle of a repeated sequence. The previous and second previous fields are combined if the current field is at the end of a repeated sequence. Furthermore, motion-adaptive deinterlacing procedure can be performed on the current and previous field pair if there appears to be no valid combination of fields to reconstruct an original source frame.

Once lock has been acquired, field pairs are combined to form a deinterlaced output stream. The lock state alone does not solely enable this combination however. Rather, multiple factors must be present for field pairs to be combined to form the output. These factors include lock, current and previous states, dynamic range and field pair quality, and cadence.

There are "strong" and "weak" detections for the various field combination possibilities. A strong detection generally occurs when both the 1-field and 2-field measurements are in agreement and the quality metrics are not too low. Weak detections occur when only one of the 1-field or 2-field measurements is valid and requires that the quality metrics are high. There can be a prioritized sequence of decisions regarding which fields to combine, with strong detections having precedence and the weak detections being valid only if the strong detections are not. This prevents a weak detection decision criteria from being used when a higher-confidence, strong detection is present.

As described above, when the current state is "Start" or "Middle," then the current and previous fields are combined. When the state is "End," the previous and second previous fields are combined. When the 2-field state is "InBetween" (and there is no conflicting 1-field state), the first of the two "InBetween" states is treated as a "Start" and the second is treated as an "End," When no valid overall system state is determined to exist, then the lock signal is de-asserted, combination of field pairs stops, and the system drops back to motion-adaptive deinterlacing. At block 491, a deinterlaced frame is output.

All of the various measurements and quality metrics, particularly as described in reference to FIG. 5, are not absolutely required. Indeed, a subset of factors and measurements may be used. The more factors that are considered, however, the more confidence that can be achieved in the decision.

While FIG. 3 and the corresponding discussion above provide a general description of a suitable environment in which embodiments of the invention may be implemented, features of embodiments of the present invention disclosed herein may be practiced in association with a variety of different system configurations. Embodiments of the invention may be implemented in hardware, software, or any combination thereof, whether now existing or to be developed in the future. Where desired, the operations of the various embodiments of the present invention may be incorporated into computer-executable instructions that may be stored on a computer-readable medium.

Embodiments of the invention can take the form of instructions, such as program modules, being executed by processors. Generally, program modules include routines, programs, objects, components, data structures, etc., that perform particular tasks or implement particular abstract data types. The sequences of instructions implemented in a particular data structure or program module represent examples of corresponding acts for implementing the functions or steps described herein.

As used herein, the term "embodiment" means an embodiment that serves to illustrate by way of example but not limitation. Also, reference has been made to an image represented by pixels. However, in other embodiments, the image can be represented by any convenient and/or known discrete component that forms the basic unit of the composition of an image.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method of deinterlacing an interlaced video stream, comprising:
    detecting whether groups of adjacent fields are derived from a common image frame source, wherein the detecting of adjacent fields that are derived from the common image frame source includes:
    performing a correlation operation between field pairs, and
    calculating a threshold value based on one or more factors, wherein the factors comprise a history of correlation operation values between field pairs, a minimum and maximum value in the history of correlation operation values, a minimum and maximum value for a range of correlation values, and detected scene transitions; and
    merging field pairs of the interlaced video stream if the field pairs of the interlaced video stream are determined to be derived from the common image frame source.

2. The method recited in claim 1, further comprising deinterlacing the interlaced video stream using motion adaptive deinterlacing if the field pairs of the interlaced video stream are determined not to be derived from the common image frame source.

3. The method recited in claim 1, wherein performing a correlation operation between field pairs further comprises:
    performing a difference operation between field pairs that are spaced one field apart.

4. The method recited in claim 3, further comprising:
    phase shifting field pairs to result in two spatially coincident calculated fields.

5. The method recited in claim 3, further comprising:
    performing a vertical low-pass filtering operation on each field of the field pairs to remove noise and aliasing artifacts.

6. The method recited in claim 1, wherein performing a correlation operation between field pairs comprises:
    performing a difference operation between field pairs that are spaced two fields apart.

7. The method recited in claim 1, wherein adjacent fields that are derived from the common image frame source are further detected by:
    determining whether a scene transition has occurred.

8. The method recited in claim l, wherein determining if field pairs of the interlaced video stream are derived from the common image frame source further comprises:
    comparing a correlation value for a field pair with the threshold value, wherein a correlation value smaller than the threshold value indicates a field pair that is from a common source.

9. The method recited in claim 8, wherein determining if field pairs of the interlaced video stream are derived from the common image frame source further comprises:

examining a history of comparison values obtained from comparing correlation values with the threshold value to determine if a repeating pattern exists in the interlaced video stream.

10. The method recited in claim 9, wherein determining if field pairs of the interlaced video stream are derived from the common image frame source further comprises:
assigning a state value to a current field, wherein the state value is used to determine whether two fields can be properly merged.

11. The method recited in claim 9, wherein determining if field pairs of the interlaced video stream are derived from the common image frame source further comprises:
acquiring a lock on the repeating pattern.

12. The method recited in claim 9, wherein determining if a repeating pattern exists in the interlaced video stream comprises:
assigning a quality value to a field pair representing a level of similarity between correlation values of field pairs.

13. The method recited in claim 1, wherein merging field pairs of the interlaced video stream further comprises:
determining how to construct the deinterlaced output frame from the sequence of fields.

14. The method recited in claim 13, wherein motion adaptive deinterlacing is used if no repeating pattern exists.

15. A non-transitory computer-readable storage having stored thereon computer-executable instructions to deinterlace image signals, the computer-executable instructions comprising:
detecting whether groups of adjacent fields are derived from a common original image frame source, wherein the detection of adjacent fields that are derived from the common image frame source includes:
performing a correlation operation between field pairs, wherein performing a correlation operation between field pairs comprises:
performing a difference operation between field pairs that are spaced one field apart, and
phase shifting field pairs to result in two spatially coincident calculated fields, and
calculating a threshold value based on one or more factors, wherein the factors comprise a history of correlation operation values between field pairs, a minimum and maximum value in the history of correlation operation values, a minimum and maximum value for a range of correlation values, and detected scene transitions; and merging field pairs of the interlaced video stream if the field pairs of the interlaced video stream are determined to be derived from the common image frame source.

16. The non-transitory computer-readable storage of claim 15, further comprising computer-executable instructions for:
deinterlacing the interlaced video stream using motion adaptive deinterlacing if the field pairs of the interlaced video stream are determined not to be derived from the common image frame source.

17. The non-transitory computer-readable storage of claim 15, wherein determining if field pairs of the interlaced video stream are derived from the common image frame source further comprises:
comparing a correlation value for a field pair with the threshold value, wherein a correlation value smaller than the threshold value indicates a field pair that is from a common source.

18. The non-transitory computer-readable storage recited in claim 17, wherein determining if field pairs of the interlaced video stream are derived from the common image frame source further comprises:
examining a history of comparison values obtained from comparing correlation values with the threshold value to determine if a repeating pattern exists in the interlaced video stream.

19. The non-transitory computer-readable storage recited in claim 18, wherein determining if field pairs of the interlaced video stream are derived from the common image frame source further comprises:
assigning a state value to a current field, wherein the state value is used to determine whether two fields can be properly merged.

20. The non-transitory computer-readable storage recited in claim 18, wherein determining if field pairs of the interlaced video stream are derived from the common image frame source further comprises:
acquiring a lock on the repeating pattern.

* * * * *